(12) United States Patent
Krueger

(10) Patent No.: US 12,121,883 B2
(45) Date of Patent: Oct. 22, 2024

(54) CATALYST FOR USE IN THE CATALYTIC REDUCTION OF SULFUR CONTAINED IN A GAS STREAM AND METHOD OF MAKING AND USING SUCH CATALYST

(71) Applicant: SHELL USA, INC., Houston, TX (US)

(72) Inventor: Karl Marvin Krueger, Houston, TX (US)

(73) Assignee: SHELL USA, INC., Houston, TX (US)

(*) Notice: Subject to any disclaimer, the term of this patent is extended or adjusted under 35 U.S.C. 154(b) by 0 days.

(21) Appl. No.: 18/448,556

(22) Filed: Aug. 11, 2023

(65) Prior Publication Data
US 2023/0381755 A1 Nov. 30, 2023

Related U.S. Application Data

(62) Division of application No. 17/378,039, filed on Jul. 16, 2021, now Pat. No. 11,819,829.

(60) Provisional application No. 63/053,151, filed on Jul. 17, 2020.

(51) Int. Cl.
| | | |
|---|---|---|
| B01J 23/882 | (2006.01) | |
| B01D 53/86 | (2006.01) | |
| B01J 6/00 | (2006.01) | |
| B01J 37/02 | (2006.01) | |
| B01J 37/08 | (2006.01) | |

(52) U.S. Cl.
CPC ........ *B01J 23/882* (2013.01); *B01D 53/8606* (2013.01); *B01D 53/8609* (2013.01); *B01J 6/001* (2013.01); *B01J 37/0201* (2013.01); *B01J 37/0215* (2013.01); *B01J 37/08* (2013.01)

(58) Field of Classification Search
CPC ...... B01J 23/882; B01J 6/001; B01J 37/0201; B01J 37/0215; B01J 37/08; B01D 53/8606; B01D 53/8609
USPC .................................................... 423/244.02
See application file for complete search history.

(56) References Cited

U.S. PATENT DOCUMENTS

| | | |
|---|---|---|
| 5,132,098 A | 7/1992 | Kvasnikoff et al. |
| 5,686,375 A | 11/1997 | Tyer et al. |
| 8,142,748 B2 | 3/2012 | Massie |
| 8,883,673 B2 | 11/2014 | Bhan |
| 10,220,379 B2 | 3/2019 | Bhan et al. |
| 10,562,014 B2 | 2/2020 | Krueger et al. |
| 2015/0111726 A1 | 4/2015 | Bhan et al. |

OTHER PUBLICATIONS

International Search Report and Written Opinion Received for PCT Patent Application No. PCT/US2021/042001, Mailed on Nov. 8, 2021, 10 Pages.

*Primary Examiner* — Stefanie J Cohen
*Assistant Examiner* — Catriona M Corallo
(74) *Attorney, Agent, or Firm* — SHELL USA, INC.

(57) ABSTRACT

Presented is a catalyst composition having exceptional properties for converting sulfur, sulfur compounds, and carbon monoxide contained in gas streams by catalyzed hydrolysis, hydrogenation and water-gas shift reactions. The catalyst comprises underbedded molybdenum and cobalt with an overlayer of molybdenum and cobalt. These metals are present in the catalyst within certain concentration ranges and relative weight ratios. The underbedded metals are present in the catalyst within a specified range relative to the overlayer and total metals. The underbedded metals are formed by co-mulling an inorganic oxide with the catalytically active metals of molybdenum and cobalt. The co-mulled mixture is calcined and then impregnated with overlaid molybdenum and cobalt.

10 Claims, 4 Drawing Sheets

CATALYST FOR USE IN THE CATALYTIC REDUCTION OF SULFUR CONTAINED IN A GAS STREAM AND METHOD OF MAKING AND USING SUCH CATALYST

REFERENCE TO RELATED APPLICATIONS

The present application is a divisional of U.S. patent application Ser. No. 17/378,039, filed Jul. 16, 2021, which claims the benefit of priority of U.S. Provisional Application Ser. No. 63/053,151, filed Jul. 17, 2020 which are incorporated herein by reference in their entirety.

The present invention relates to a catalyst composition useful in the catalytic reduction of sulfur compounds that are contained in a gas stream, a method of making such catalyst composition, and a hydrolysis process for the reductive conversion of sulfur compounds contained in a gas stream.

BACKGROUND OF THE INVENTION

In the well-known Claus process, an acid gas that contains a significant percentage of hydrogen sulfide ($H_2S$) is combusted in a thermal stage in order to oxidize a portion of the $H_2S$ to sulfur dioxide ($SO_2$). This combustion is controlled to provide a process gas stream containing $H_2S$ and $SO_2$ that are present in an approximate molar ratio of 2 moles of $H_2S$ per mole of $SO_2$ (2:1). This process gas stream is passed to a catalytic stage providing for the reaction of $H_2S$ and $SO_2$ in the presence of an alumina catalyst in accordance with the Claus reaction to yield elemental sulfur and water. The sulfur is then condensed from the Claus reaction gas to yield a Claus tail gas stream.

The Claus tail gas stream typically contains small concentrations of $H_2S$ and other sulfur compounds, such as, $SO_2$, carbon disulfide ($CS_2$), carbonyl sulfide (COS), and elemental sulfur (S). In order for this tail gas stream to be combusted, or otherwise disposed of, it must further be processed to remove most of the sulfur. This provides a treated gas having a sufficiently low sulfur content that allows its combustion or release into the atmosphere.

One method of treating the tail gas is to pass it to a reduction reactor. The reduction reactor provides for catalytic reduction of sulfur compounds (i.e., $SO_2$, $CS_2$, COS, and S) contained in the tail gas to $H_2S$ to yield a treated gas stream having a reduced concentration of the sulfur compounds. This treated gas stream may further be processed to remove $H_2S$, for example, by passing it to an absorption unit that removes the $H_2S$. This is typically done by contacting the treated gas stream with an $H_2S$ removal absorbent.

U.S. Pat. No. 5,132,098 (Kvasnikoff et al.) discloses a process in which the sulfur compounds of $SO_2$, $CS_2$, COS and elemental sulfur contained in a Claus unit tail gas (residual gas) are catalytically converted by either hydrogenation or hydrolysis to $H_2S$. This hydrogenation or hydrolysis treatment is carried out at a temperature in the range of from 140° C. to 550° C. using a catalyst that contains a compound of a metal selected from the metals of groups Va, VIa and VIII of the periodic table which is deposited on a silica or silica/alumina support. A more specific catalyst disclosed in the '098 patent is an impregnated bead that includes cobalt oxide and molybdenum oxide deposited on alumina. While the '098 patent discloses a catalyst including alumina impregnated with 1.75 wt % cobalt and 8 wt % molybdenum, there are no teachings concerning the ranges of these components or concerning the form of the alumina of the catalyst. There further is no recognition of the application of underbedded and overlaid metals in the hydrolysis catalyst or the importance of the method of preparation of the catalyst in providing for low-temperature hydrogenation and hydrolysis reactions or in providing for high conversion of sulfur compounds to hydrogen sulfide.

U.S. Pat. No. 10,562,014 (Krueger et al.) discloses a high metals content catalyst useful in low-temperature conversion of sulfur compounds, such as sulfur dioxide, carbonyl sulfide, carbon disulfide and sulfur, that may be contained in a gas stream. The catalyst is prepared by co-mulling its components that include cobalt and molybdenum metals. The co-mulled mixture is dried and calcined. The catalyst contains at least 7.5 wt. % up to 15 wt. % molybdenum and at least 2.75 wt. % up to 6 wt. % cobalt. The pore structure is an important property of the catalyst. It is bimodal with a first major portion of the total pore volume in pores of diameter in the range of from 50 Å to 150 Å and a minor portion of the total pore volume in pores of diameter in the range of from 1,000 Å to 10,000 Å. Less than 6% of the total pore volume of the catalyst is contained within its pores having a pore diameter greater than 10,000 Å. There is no mention of underbedded or overlaid metal components in the catalyst.

U.S. Pat. No. 5,686,375 (Iyer et al.) discloses a hydroprocessing catalyst for processing hydrocarbon feedstocks, such as gas oils, to reduce concentrations of nitrogen and sulfur compounds by converting them respectively to ammonia and hydrogen sulfide. The catalyst contains underbedded Group VIII hydrogenation metal component that is preferably nickel. The catalyst further has an overlayer of catalytic promoter metal that may include a Group VIB metal that is preferably molybdenum and an optional Group VIII metal. The catalyst contains greater than 3.0 wt. % of the Group VIII metal component and greater than 10 wt. % of the Group VIB metal component. The catalyst has a narrow pore size distribution about the medium pore diameter with at least 50 percent of the total pore volume distributed within 20 angstroms above and below the median pore diameter. The '375 patent makes no distinction in the quantities of metals that are underbedded or in the overlayer. Only Group VIII metal is underbedded. There is no underbedded Group VIB metal in the catalyst. There are no teachings in the '375 patent regarding the ratios of underbedded and overlaid metals especially that which is necessary for promoting hydrolysis reactions. The catalyst is used in hydrodenitrogenation and hydrodesulfurization and not to promote hydrolysis.

U.S. Pat. No. 10,220,379 (Bhan et al.) discloses a catalyst for use in selectively desulfurizing sulfur compounds in olefin-containing hydrocarbon feedstocks. The catalyst has a bimodal pore structure, contains underbedded nickel, molybdenum and, optionally, phosphorus with an overlayer of molybdenum and cobalt. The nickel content is substantially or completely in the form of underbedded nickel. To make the catalyst, inorganic oxide, molybdenum and nickel are co-mulled, shaped, and calcined to provide the shaped and calcined particle that is impregnated with an overlayer of cobalt, molybdenum, and phosphorus. The amount of molybdenum in the calcined and shaped particle is from 2 wt. % to 7 wt. %, and the amount of nickel is from 0.5 wt. % to 2 wt. %. The molybdenum content in the final catalyst is in the range of from 9 wt. % to 23 wt. % and the cobalt content is from 2 wt. % to 8 wt. %.

SUMMARY OF THE INVENTION

There are ongoing efforts to develop improved catalyst compositions for use in hydrolysis of sulfur compounds contained in gas streams. It is further desired to develop improved catalysts that provide for high percentage conversion under low-temperature reaction conditions of sulfur compounds contained in gas streams such as Claus tail gas streams to hydrogen sulfide.

Thus, accordingly, provided is a catalyst composition useful in the catalytic reduction of sulfur compounds contained in a gas stream. The catalyst composition comprises an inorganic oxide, underbedded molybdenum, underbedded cobalt, overlaid molybdenum, and overlaid cobalt.

Another embodiment of the catalyst composition comprises a calcined co-mulled mixture of an inorganic oxide, a first molybdenum compound, and a first cobalt compound. The calcined co-mulled mixture is impregnated with a second molybdenum compound and a second compound. The impregnated metals are overlaid to provide the underbedded molybdenum, underbedded cobalt, overlaid molybdenum, and overlaid cobalt.

The inventive catalyst composition is made by co-mulling an inorganic oxide, a first molybdenum compound, and a first cobalt compound to provide a co-mulled mixture. The co-mulled mixture is formed into a formed agglomerate. The formed agglomerate is dried and then calcined under first calcination conditions to provide a calcined formed agglomerate. A second molybdenum compound and a second cobalt compound are incorporated into the calcined formed agglomerate to provide an impregnated formed agglomerate. The impregnated formed agglomerate is dried and then calcined under second calcination conditions to provide the catalyst composition.

The catalyst composition has application in the hydrolysis of sulfur compounds and carbon monoxide contained in gas streams. This process comprises introducing a gas stream, comprising a sulfur compound or carbon monoxide, or both, into a reactor that defines a reaction zone containing the inventive catalyst composition. The gas stream is contacted with the catalyst composition under hydrolysis reaction conditions.

DETAILED DESCRIPTION OF THE INVENTION

Figure 1:
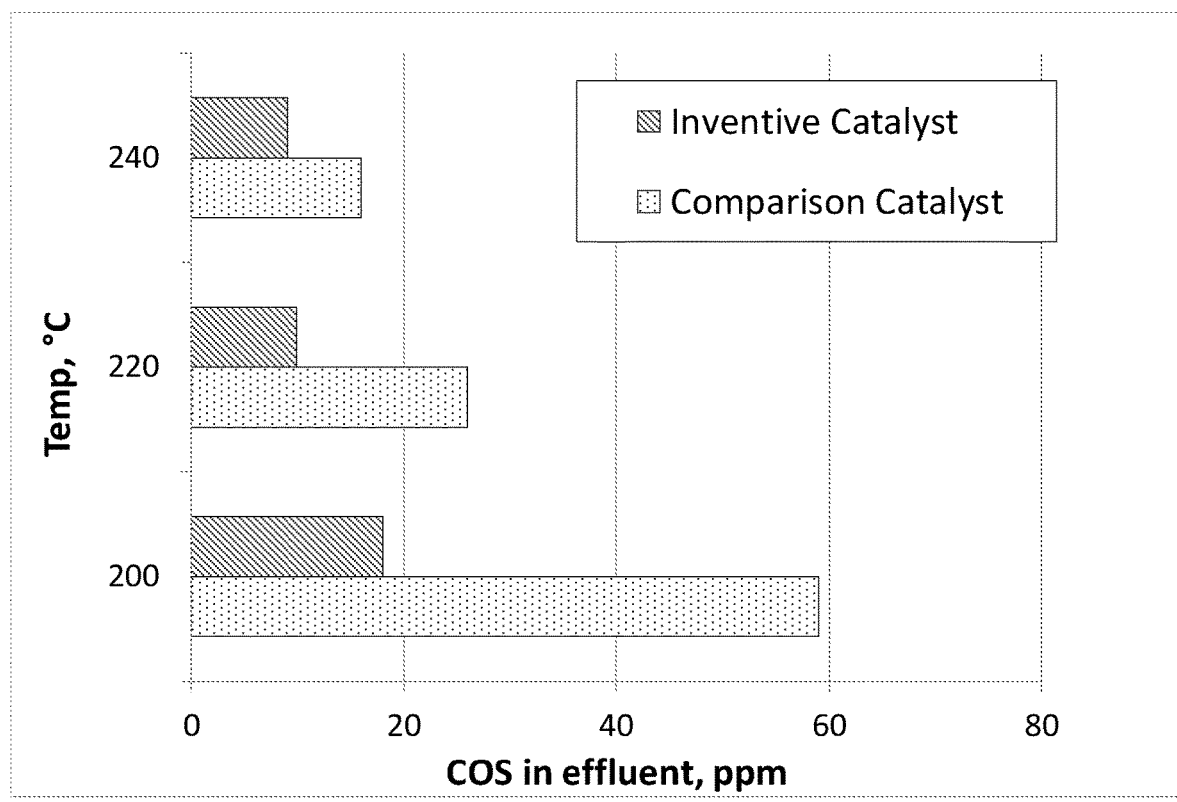
FIG. 1 is a bar chart comparing the performance of the inventive catalyst to that of a comparison catalyst when used in the hydrolysis conversion of carbonyl sulfide (COS) contained in a synthetic tail gas feed by showing the unconverted COS of the effluent of the reactor operated at various reactor temperatures.

The catalyst of the invention has properties that make it particularly useful in the low-temperature hydrolysis of carbonyl sulfide (COS) and carbon disulfide ($CS_2$) that may be contained in gas streams such as Claus tail gases or other gas streams having concentrations of carbonyl sulfide and carbon disulfide that need to be removed or reduced to acceptable levels. This catalyst also has application in low-temperature conversion of carbon monoxide of the water-gas shift reaction.

The term hydrolysis reaction is used in this specification to mean the reaction of carbonyl sulfide with water to yield hydrogen sulfide and carbon dioxide and carbon disulfide with water to yield hydrogen sulfide and carbon dioxide.

The catalyst of the invention also promotes low temperature hydrogenation of $SO_2$ to yield water and sulfur and the hydrogenation of $S_x$ to $H_2S$. An undesired reaction that may be promoted by a treatment catalyst is the hydrogenation conversion of carbon disulfide to methyl mercaptan and hydrogen sulfide.

The references herein to the water-gas shift reaction are to the equilibrium reaction of carbon monoxide and water to carbon dioxide and hydrogen.

A novel catalyst composition has been invented that has exceptional properties for converting sulfur, sulfur compounds, and carbon monoxide contained in gas streams by catalyzed hydrolysis, hydrogenation and water-gas shift reactions. It is the unique combination of features of the inventive catalyst that provides for its enhanced catalytic properties. One of these features which is different from prior art compositions is that the inventive catalyst comprises both molybdenum and cobalt metals in an underbedded form and both molybdenum and cobalt as overlaid metals. These metals should be present in the inventive composition within certain defined concentration and relative weight ratio ranges. Further embodiments of the inventive catalyst require certain weight ratios of the underbedded metals relative to the overlaid metals that are within specified ranges.

When referring herein to a metal that is "underbedded", what is meant is a catalytic metal or metal precursor or compound that is uniformly dispersed in an inorganic oxide support material, such as alumina, to form a mixture that is thereafter calcined and subsequently contacted with a second catalytic metal or metal precursor or compound followed by a second calcination. The subsequent contacting of the calcined mixture with the second metal is preferably done by metals impregnation. The metal that is first mixed with the inorganic oxide and followed by calcination is referred to as "underbedded" metal; because, the subsequent contacting of this calcined mixture with the second metal is thought of as "overlaying" the metal of the calcined mixture with an overlayer of the second metal. Thus, the term "overlaid" or "overlayer" or similar terminology refers herein to the second catalytic metal or metal precursor or compound that is placed on top or overlaid onto the metal of the calcined mixture that has become underbedded as a result.

The inventive catalyst includes both underbedded molybdenum and underbedded cobalt that are overlaid with both molybdenum and cobalt. In fact, an essential feature of the inventive catalyst is that it includes both underbedded metal and overlaid metal. Not only is it important for the inventive catalyst to include both underbedded and overlaid metals, but the metals should be present in the composition in appropriate relative amounts in order to give a catalyst having the noted enhanced catalytic properties. The total amounts of the metals contained in the catalyst are also important to providing a catalyst having the performance characteristics of the inventive catalyst.

The inventive catalyst should have a total molybdenum content of at least 7.4 wt. % and a total cobalt content of at least 2.7 wt. %. This wt. % is based on the total weight of the catalyst composition and the respective metal component as an oxide. When referring to the total molybdenum content or total cobalt content of the catalyst, what is meant by these terms is the total weight of the indicated metal contained in the entire composition including the sum of both the underbedded metal content and the overlaid metal content.

The total molybdenum content of the catalyst is preferably in the range of from 7.6 wt. % to 22 wt. %. More preferably, the total molybdenum content of the catalyst is in the range of from 7.8 wt. % to 20 wt. %, and, most preferably, from 7.8 wt. % to 18 wt. %.

The total cobalt content of the catalyst is preferably in the range of from 3 wt. % to 8 wt. %. More preferably, the total cobalt content of the catalyst is preferably in the range of from 3.3 wt. % to 6 wt. %, and, most preferably, from 3.6 wt. % to 5 wt. %.

Generally, then, the total metals ratio of the total amount of molybdenum content of the catalyst divided by the total amount of cobalt content of the catalyst is in the range of from 1.5:1 to 8:1. It is preferred for the total metals ratio to be in the range of from 1.7:1 to 6:1, and, more preferred, from 2:1 to 5:1. The total metals ratio is calculated on an elemental basis and the total weight of the catalyst.

As has been noted, an essential feature of the inventive catalyst is that it comprises both underbedded and overlaid metals. It has been found that the ratio of the amount of underbedded metal to overlaid metal is important to providing an inventive catalyst having the enhanced catalytic properties described herein. If the relative ratio is too low there is little catalytic benefit provided by the combined underbedding and overlaying of the metals, but if the relative ratio is too high, then there is little catalytic benefit as well. While it is not known with much certainty why having the combination of underbedded and overlaid metals in the required relative weight ratios, it is thought that several different active catalyst phases are formed by the co-mulling of metals with the inorganic support and by the metals impregnation. It is theorized that one catalyst phase works better in promoting one type of reaction and the other catalyst phase works better in promoting another type of reaction.

Consequently, in an embodiment of the inventive catalyst, its molybdenum ratio is in the range of from 1:5 to 4:5 and the cobalt ratio is in the range of from 1:5 to 4:5. It is preferred for these ratios to both be within the range of from 1:4 to 3:4, and, more preferred, in the range of from 1:3 to 2:3.

When referring to the molybdenum ratio, what is meant is the weight percent of the molybdenum of the catalyst that is in the underbedded form divided by the total molybdenum content of the catalyst. The ratio is computed on the basis of the molybdenum as an oxide.

When referring to the cobalt ratio, what is meant is the weight percent of the cobalt of the catalyst that is in the underbedded form divided by the total cobalt content of the catalyst. The ratio is computed on the basis of the cobalt as an oxide.

The total amount of underbedded molybdenum in the inventive catalysts should generally be within the range of from 1.2 to 12.5 wt. %. Preferably, the underbedded molybdenum is present in the catalyst in an amount within the range of from 1.15 to 11 wt. %, and more preferably, within the range of from 1.2 to 10 wt. %. The total amount of underbedded cobalt in the inventive catalyst should be within the range of from 0.5 to 5 wt. %. Preferably, the underbedded cobalt is present in the catalyst in an amount within the range of from 0.55 to 4 wt. %, and, more preferably, within the range of from 0.6 to 3 wt. %. These wt. % values are based on the total weight of the catalyst and each respective metal component as an oxide.

The inorganic oxide component of the catalyst is selected from any refractory oxide material that has properties suitable for use as the support component of the inventive catalyst composition. Examples of possible suitable porous refractory oxide materials include silica, magnesia, silica-titania, zirconia, silica-zirconia, titania, silica-titania, alumina, silica-alumina, and alumino-silicate. The preferred porous refractory oxide is selected from the group consisting of alumina, silica, and alumina-silica. The more preferred refractory oxide for use in the inventive catalyst is alumina. The inorganic oxide component of the catalyst is present in an amount in the range of from 65 to 90 wt. % of the total weight of the composition. It may also be present in the catalyst in an amount in the range of from 70 to 90 wt. % or 75 to 89 wt. %.

As noted above, it is theorized that the way by which the inventive catalyst is made, and its physical characteristics, have something to do with its enhanced catalytic properties and in forming the multiple active catalytic phases. The co-mulling of the metals with the inorganic oxide to provide a homogenous mixture that is calcined before impregnation with metals is thought to yield a certain catalytic phase that is different from the catalytic phase formed by the metals impregnation followed by calcination.

In the method of making the catalyst of the invention two metals incorporation steps and two calcination steps are used. Each of these steps is believed to provide for different active catalytic phases in the final catalyst. The first metals incorporation step is performed by co-mulling the starting metal components with an inorganic oxide to give a co-mulled mixture having the metal components uniformly or homogenously dispersed within the inorganic oxide material. This co-mulled mixture is preferably formed into agglomerates or particles, such as extrudates, that are dried and calcined. The second metals incorporation step is performed by contacting the calcined particles with an overlayer of metal components, preferably by applying one or more aqueous metal impregnation solutions, to give metals-impregnated formed agglomerates that are dried and calcined.

What is meant by the use of the term "co-mulled" is that the starting materials of the catalyst are combined and mixed together to form a mixture of the individual components that is preferably or substantially uniform or homogeneous. This term is intended to be broad enough in scope to include mixing of the starting materials that include alumina, a cobalt compound, and a molybdenum compound to yield a co-mulled mixture that can be formed into agglomerate particles. The co-mulled mixture can be a paste or a plastic mixture that is capable of being formed into agglomerate particles by any of the known agglomeration methods or extruded into extrudate particles by any of the known extrusion methods.

The preferred method of agglomerating the co-mulled mixture is by extrusion to form extrudate particles having overall diameters in the range of from 0.5 mm to 10 mm or from 0.75 mm to 8 mm and length to diameter ratios of from 1:1 to 10:1 or even higher. The extrudates can be any of the typical shapes such as cylinders and multilobal shapes.

Thus, the formation of the co-mulled mixture is done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable.

Suitable types of batch mixers include, but are not limited to, change-can mixers, stationary-tank mixers, double-arm kneading mixers that are equipped with any suitable type of mixing blade.

Suitable types of continuous mixers include, but are not limited to, single or double screw extruders, trough-and-screw mixers and pug mills.

The mixing of the starting materials used in the preparation of the co-mulled mixture can include water and appropriate amounts of a mineral acid, such as nitric acid, as is necessary to provide the aforementioned paste-like mixtures having a loss on ignition (LOI) in the range of from 40% to 80% as determined by the standard test method ASTM D7348. It has been found that the co-mulled mixture with an LOI in this range provides for a paste having desirable extrusion properties, and it contributes to a finished catalyst product having the required pore structure characteristics of the inventive catalyst as described in detail throughout this specification.

The mixing of the starting materials used in the preparation of the co-mulled mixture is conducted for time period necessary to properly homogenize the co-mulled mixture. Generally, the blending time is in the range of upwardly to 12 or more hours. Typically, the blending time is in the range of from 0.1 hours to 1 hour.

The cobalt compound of the co-mulled mixture is a cobalt compound that is convertible to an oxide upon calcination within the presence of oxygen. The cobalt compound can be selected from suitable cobalt salt compounds. Such compounds may include a cobalt compound selected from ammonium cobalt compounds, and phosphates, nitrates, oxalates, sulfates, and halides of cobalt. A particularly favorable cobalt salt that is found to be a useful cobalt compound for the co-mulled mixture is cobalt nitrate. It is preferable to combine the cobalt compound with the other components of the co-mulled mixture in the form of a first aqueous solution that comprises cobalt. The first aqueous solution may be formed by dissolving the cobalt salt in water. The most preferred cobalt salt is cobalt nitrate.

The molybdenum compound of the co-mulled mixture is a molybdenum compound that is convertible to an oxide upon calcination within the presence of oxygen. The molybdenum compound can be selected from suitable molybdenum salt compounds. Such compounds may include a molybdenum compound selected from such compounds as ammonium molybdate, potassium molybdate, sodium molybdate, phosphomolybdic acid, molybdenum disulphide, molybdenum trioxide, and molybdic acid. It is preferable to combine the molybdenum compound with the other components of the co-mulled mixture in the form of a second aqueous solution that comprises molybdenum. The second aqueous solution may be formed by dissolving the molybdenum salt in water. The most preferred molybdenum salt is an ammonium molybdate such as ammonium heptamolybdate and ammonium dimolybdate.

The formed agglomerate of the co-mulled mixture is dried and then calcined. The drying of the co-mulled mixture is not a critical step and is generally performed in air and at a drying temperature in the range of from 20° C. to 125° C. The time period for drying is any suitable time period that can provide the desired amount of drying.

Calcination of the co-mulled mixture is a necessary step of the inventive method. It provides for the conversion of the metal compounds to their oxide forms and yields the intermediate calcined formed agglomerates or particles.

The calcination of the formed aggregates or agglomerates of the co-mulled mixture is conducted in the presence of an oxygen-containing fluid, such as air, at a temperature and for a time period that are suitable for achieving the desired degree of calcination to provide the final catalyst composition of the invention. Generally, the calcination temperature is in the range of from 300° C. to 800° C., preferably, from 350° C. to 700° C., and more preferably, from 400° C. to 600° C. The calcination time period can be in the range of from 0.1 hour to 96 hours.

The concentration levels of the metal components of the calcined co-mulled mixture and their importance are described above.

The resulting impregnated formed agglomerate or impregnated particle is dried and then calcined. The drying of the impregnated particle is not a critical step and is generally performed in air and at a drying temperature in the range of from 20° C. to 125° C. The time period for drying is any suitable time period that can provide the desired amount of drying.

The calcination of the impregnated particle is conducted in the presence of an oxygen-containing fluid, such as air, at a temperature and for a time period that are suitable for achieving the desired degree of calcination to provide the final catalyst composition of the invention. Generally, the calcination temperature is in the range of from 300° C. to 800° C., preferably, from 350° C. to 700° C., and more preferably, from 400° C. to 600° C. The calcination time period can be in the range of from 0.1 hour to 96 hours.

The concentration levels of the metal components of the final catalyst composition and their importance are described above.

The inventive catalyst composition is useful in the hydrolysis of sulfur compounds that are contained in a gas stream, and, more particularly, the catalyst composition is especially useful in the treatment of tail gas streams generated by Claus process units in order to convert the sulfur compounds contained in the tail gas stream to $H_2S$, which subsequently may be removed by any of the many suitable means or methods known to those skilled in the art for removing $H_2S$ from a gas stream.

The catalyst composition has certain unique catalytic properties when used in the treatment of Claus unit tail gas streams that allows for the operation of a hydrolysis reactor at lower temperature conditions than required for hydrolysis reactors that utilize conventional catalysts, and the catalyst composition provides for a high conversion of the sulfur compounds even at the lower reactor temperature conditions.

The catalyst composition further allows for the passing of the gas stream through the hydrolysis reactor at a much higher flow rate, and, thus, a much higher space velocity, than is allowed for hydrolysis reactors that are loaded with conventional catalysts, but, still provide for a high conversion of sulfur compounds at the reduced reactor temperature conditions.

In the operation of a typical conventional hydrolysis reactor system, which includes a reactor loaded with a conventional hydrolysis catalyst, the tail gas is required to be heated up significantly prior to its introduction into the hydrolysis reactor. This is due to the tail gas that is discharged from a Claus unit passing from the sulfur condenser that operates close to the condensation temperature of elemental sulfur. The temperature of a typical Claus unit tail gas stream is in the range of from 110° C. to 125° C. For conventional hydrolysis units, the tail gas typically must be heated up so that the introduction temperature, or reactor inlet temperature, of the tail gas feed to the hydrolysis reactor is in the range of from 250° C. to 350° C. Any reduction of this required tail gas feed inlet temperature to the hydrolysis reactor will provide significant energy savings in its operation.

The use of the inventive catalyst composition in the treatment of a Claus tail gas stream can, thus, provide significant energy savings by reducing the temperature required to treat a Claus tail gas stream.

The gas stream that can be treated using the inventive catalyst composition includes one or more gaseous compounds, and, further, it comprises at least one sulfur compound. As the term is used herein, a sulfur compound is a molecular or elemental compound selected from the group of compounds consisting of carbonyl sulfide (COS), carbon disulfide ($CS_2$), sulfur dioxide ($SO_2$), and elemental sulfur ($S_x$). Hydrogen sulfide is omitted from this definition of a sulfur compound; because, the inventive catalyst composition is not intended to provide for the conversion of $H_2S$, but, rather, the sulfur compounds are intended to be reduced by a reduction reaction to hydrogen sulfide.

The hydrogen sulfide may afterward be removed from the treated gas stream. The gas stream, thus, includes a compound that is normally gaseous or is in the gas phase at the temperature and pressure conditions of the hydrolysis reactor operation. Examples of gaseous compounds, other than the aforementioned sulfur compounds, include nitrogen, oxygen, carbon dioxide, carbon monoxide, hydrogen, water, and lower hydrocarbons such as methane, ethane and ethylene.

The total concentration of sulfur compounds contained in the gas stream that is charged to or introduced into the hydrolysis reactor containing the inventive catalyst composition can be in the range of from 0.01 volume % (100 ppmv) to 5 volume % of the total gas stream. More typically, the sulfur compound concentration is in the range of from 0.02 vol. % (200 ppmv) to 3 vol. %.

As earlier noted, the catalyst composition is particularly suited for the treatment of a Claus tail gas stream in order to convert the sulfur compounds contained therein to hydrogen sulfide so as to provide a treated gas stream having a reduced concentration of sulfur compounds below the concentration of sulfur compounds in the tail gas stream to be treated. The following Table 1 presents typical ranges for the more common components that make up a Claus tail gas stream.

TABLE 1

| Claus Tail Gas Composition | | | |
|---|---|---|---|
| Component | Broad Range (vol. %) | Intermediate Range (vol. %) | Narrow Range (vol. %) |
| $H_2S$ | 0.2-2 | 0.4-1.5 | 0.6-1.2 |
| $SO_2$ | 0.1-1 | 0.2-0.75 | 0.3-0.6 |
| $S_x$ | 0-0.2 | 0.005-0.15 | 0.01-0.1 |
| $CO_2$ | 1-25 | 2-22 | 3-20 |
| $H_2O$ | 20-50 | 25-40 | 30-35 |
| $N_2$ | 40-80 | 45-70 | 50-60 |
| $H_2$ | 0.5-4 | 1-3 | 1.5-2.5 |
| CO | 0.01-2 | 0.1-1 | 0.2-0.8 |
| COS | 0.005-1 | 0.015-0.5 | 0.01-0.1 |
| $CS_2$ | 0.005-1 | 0.015-0.5 | 0.01-0.1 |
| Total Sulfur Comp. | 0.11-3.2 | 0.23-1.9 | 0.33-0.9 |

In the hydrolysis process of the invention, a gas stream, having a concentration of a sulfur compound, is introduced into a hydrolysis reactor that contains the catalyst composition and that is operated at suitable hydrolysis or reduction reaction conditions. Within the hydrolysis reactor, the gas stream is contacted with the catalyst composition that is contained therein. A treated gas stream, having a reduced concentration of the sulfur compound, is yielded from the hydrolysis reactor. While the treated gas stream will have an increase in the concentration of $H_2S$ over that of the gas stream, the treated gas stream will have a reduced concentration of sulfur compounds over that of the gas stream. The reduced concentration of sulfur compounds should, generally, be less than 100 ppmv, preferably, less than 50 ppmv, and, most preferably, less than 30 ppmv.

As previously noted, one advantage from the use of the inventive catalyst composition in the hydrolysis of a Claus tail gas stream is that it allows for the operation of the hydrolysis reactor at a relatively low inlet temperature, for example, of less than 250° C. There is a minimum temperature at which the gas stream should be introduced into the hydrolysis reactor, and, thus, the inlet temperature at which the gas stream is charged to or introduced into the hydrolysis reactor is generally in the range of from 140° C. to 250° C. It is preferred for the introduction temperature to be in the range of from 150° C. to 240° C., and, more preferred, the introduction temperature is in the range of from 160° C. to 230° C. It is most preferred for the introduction temperature of the gas stream into the hydrolysis reactor to be in the range of from 170° C. to 220° C.

The operating pressure of the hydrolysis reactor is generally in the range of from 1 bar (14.5 psi) to 100 bar (1450.3 psi), preferably, from 2 bar (29.0 psi) to 70 bar (1015.3 psi), and, more preferably, from 3 bar (43.5 psi) to 50 bar (725.2 psi).

The flow rate at which the gas stream and, if any, the added reducing gas, are introduced into the hydrolysis reactor is generally such as to provide a gaseous hourly space velocity (GHSV) that is in the range of from 10 $hr^{-1}$ to 10,000 $hr^{-1}$. The term "gaseous hourly space velocity" refers to the numerical ratio of the rate at which the hydrocarbon feedstock is charged to the hydrolysis reactor in volume per hour divided by the volume of catalyst contained in the hydrolysis reactor to which the gas stream is charged. The preferred GHSV is in the range of from 10 $hr^{-1}$ to 8,000 $hr^{-1}$, more preferably, from 500 $hr^{-1}$ to 5,000 $hr^{-1}$, and, most preferably, from 1000 $hr^{-1}$ to 4,000 $hr^{-1}$.

In the processing of a Claus tail gas stream, in most instances, it will contain concentrations of water and hydrogen, which can be the source of the reducing gas required for the hydrolysis reaction of the hydrolysis process. But, in the event that the gas stream does not contain a sufficient concentration of reducing gas components, reducing gas may be added as needed to the gas stream. It is generally desirable to have amounts of the reducing gases in the gas stream that are stoichiometrically required to allow for the hydrolysis reactions to proceed to close to completion.

The following examples illustrate certain aspects of the invention, but they are not to be construed as unduly limiting the scope of the invention.

Example I

This Example I illustrates the method of preparation and catalyst composition of the invention and of a comparison catalyst.

Inventive Catalyst Composition A

An embodiment of the inventive catalyst composition was prepared by mulling a wide pore alumina powder, which comprised primarily psuedoboehmite, with nitric acid, and water in such proportions as to provide a plastic mixture, e.g., an extrudable mixture, having a water content such that its loss on ignition is around 62%. A cobalt-containing aqueous solution including cobalt was prepared by dissolving cobalt nitrate in water, and a molybdenum-containing aqueous solution including molybdenum was prepared by dissolving ammonium dimolybdate in water with 30% hydrogen peroxide. The two metal solutions were added to the mulling mixture and, after mixing for a period of time, a small percentage of ammonium hydroxide was mixed with the mulling mixture. The resulting mixture was then extruded through 3.2 mm trilobe extrusion dies, and the extrudates were dried and calcined. This intermediate catalyst composition included alumina that was predominately in the gamma form, 8.2 wt. % molybdenum, and 2.5 wt. % cobalt. The wt. % of the metals is based on the total weight of the intermediate catalyst with the metals in the oxide form.

An impregnation solution was prepared by mixing aqueous ammonia, ammonium di-molybdate and cobalt carbonate in amounts such as to target in the finished catalyst 14 wt. % molybdenum (on an elemental basis) and 3.4 wt. % cobalt (on an elemental basis). This mixture was heated to 45° C. and an amount of monoethanolamine (MEA) of from 0.5 to 0.9 moles MEA per mole cobalt was added to the mixture. The mixture was stirred while maintaining the temperature until the metal salts were digested. The solution was then cooled to approximately 30° C. and topped-off with water so as to provide a total volume of solution that approximated the pore volume of the intermediate which was to be impregnated with the solution. The above prepared co-mulled intermediate was impregnated with the solution and aged for two hours with occasional mixing to prevent agglomeration. The impregnated extrudates were dried in a convection oven at a temperature of 80° C. for two hours followed by further drying at 125° C. for two hours. The dried extrudates were calcined in a muffle furnace at a temperature of 552° C. for 75 min.

Comparison Catalyst Composition B

The comparison catalyst composition was prepared by mulling a wide pore alumina powder, which comprised primarily psuedoboehmite, with nitric acid, and water in such proportions as to provide a plastic mixture, e.g., an extrudable mixture, having a water content such that its loss on ignition is around 62%. A cobalt-containing aqueous solution including cobalt was prepared by dissolving cobalt nitrate in water, and a molybdenum-containing aqueous solution including molybdenum was prepared by dissolving ammonium dimolybdate in water with 30% hydrogen peroxide. The two metal solutions were added to the mulling mixture and, after mixing for a period of time, a small percentage of ammonium hydroxide was mixed with the mulling mixture. The resulting mixture was then extruded through 3.2 mm trilobe extrusion dies, and the extrudates were dried and calcined. This intermediate catalyst composition included alumina that was predominately in the gamma form, 9.4 wt. % molybdenum, and 3.6 wt. % cobalt. The wt. % of the metals is based on the total weight of the finished catalyst with the metals in the oxide form.

Example II

This Example II illustrates the use of the catalysts described in Example I in the hydrolysis of a gas stream containing a concentration of at least one sulfur compound and presents performance data for the catalysts.

The catalysts of Example I were performance tested using a tail gas pilot unit reactor equipped with a tube furnace used to control the reactor temperature. In preparation for the activity testing, each respective catalyst was sulfided by introducing into the reactor 3 hours at 300° C. and a 467 GHSV a feed comprising $H_2S$ and $H_2$. A synthetic tail gas that included $H_2S$, $SO_2$, COS, $CS_2$, S, $H_2$, CO, $N_2$, and steam, and having the typical composition as shown in Table 2, was then charged to the tail gas reactor, operated at various reactor temperatures, at a rate so as to provide a 2052 nGHSV (normal gas hourly space velocity, 3 psi unit pressure).

TABLE 2

| Typical Feed Composition | |
|---|---|
| Component | Mole % |
| $H_2$ | 2 |
| $CO_2$ | 7 |
| $H_2S$ | 0.8 |
| CO | 1 |
| COS | 0.025 |
| $SO_2$ | 0.4 |
| $CH_3SH$ | 0 |
| $CS_2$ | 0.025 |
| $CH_4$ | 0 |
| $H_2O$ | 26 |
| S | 0 |
| $N_2$ | 62.75 |

The composition of the reactor effluent for each of the reactor temperature conditions was analyzed using gas chromatography. The results from the testing are presented in the following Tables 3-5, which are further illustrated by the bar charts of FIGS. 1-4.

TABLE 3

| Unconverted COS in the Reactor Effluent | | | |
|---|---|---|---|
| Reactor Isothermal Temp (° C.) | Unconverted COS - Inventive Catalyst A (ppmv) | Unconverted COS - Comparison Catalyst B (ppmv) | Improvement vs. Catalyst B (%) |
| 240 | 9 | 16 | 44 |
| 220 | 10 | 26 | 62 |
| 200 | 18 | 59 | 69 |

TABLE 4

Unconverted $CS_2$ in the Reactor Effluent

| Reactor Isothermal Temp (° C.) | Unconverted $CS_2$ - Inventive Catalyst A (wt. %) | Unconverted $CS_2$ - Comparison Catalyst B (wt. %) | Improvement vs. Catalyst B (%) |
| --- | --- | --- | --- |
| 240 | 0 | 0 | N/A |
| 220 | 0 | 6 | N/A |
| 200 | 3 | 18 | 83 |

TABLE 5

Unconverted CO in the Reactor Effluent

| Reactor Isothermal Temp (° C.) | Unconverted CO - Inventive Catalyst A (wt. %) | Unconverted COS - Comparison Catalyst B (wt. %) | Improvement vs. Catalyst B (%) |
| --- | --- | --- | --- |
| 240 | 0.0055 | 0.0189 | 71 |
| 220 | 0.0078 | 0.0440 | 82 |
| 200 | 0.0349 | 0.1635 | 79 |

The data presented in the above Tables show that the inventive catalyst, which includes both underbedded metals and overlaid metals, exhibits significantly better catalytic performance than the comparison catalyst, which does not have underbedded metals.

FIG. 1 shows the data presented in Table 3 in the form of a bar chart, and it helps illustrate the enhanced performance characteristics of the inventive catalyst (Inventive Catalyst A) when compared to a catalyst not having underbedded metals (Comparison Catalyst B). These experimental results show that the inventive catalyst can be operated approximately 20° C. lower in temperature than the comparison catalyst while still maintaining roughly the same COS in the effluent. This is an extremely large improvement of approximately 144% in catalyst activity. The inventive catalyst provides for significantly improved COS removal over that of the comparison catalyst for any given reactor temperature.

Figure 2:
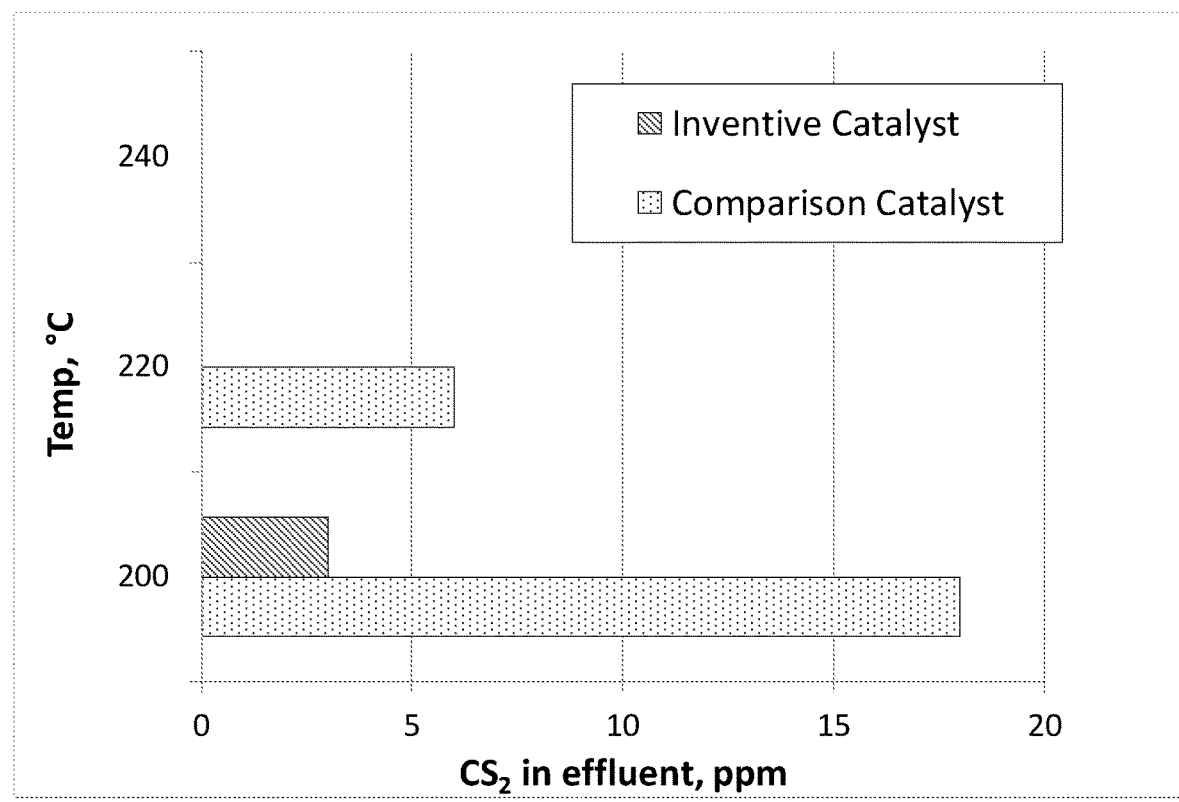
FIG. 2 is a bar chart comparing the performance of the inventive catalyst to that of a comparison catalyst when used in the hydrolysis conversion of carbon disulfide ($CS_2$) contained in a synthetic tail gas feed by showing the unconverted $CS_2$ of the effluent of the reactor operated at a given reactor temperature.

FIG. 2 shows the data presented in Table 4 in the form of a bar chart, and it helps illustrate the enhanced performance characteristics of the Inventive Catalyst A when compared to Comparison Catalyst B. These experimental results show that the inventive catalyst can be operated more than 20° C. lower in temperature than the comparison catalyst while maintaining roughly the same $CS_2$ in the effluent. This is an extremely large improvement of approximately 72% in catalyst activity. The inventive catalyst provides for significantly improved $CS_2$ removal over that of the comparison catalyst for the lower reactor temperatures.

Figure 3:
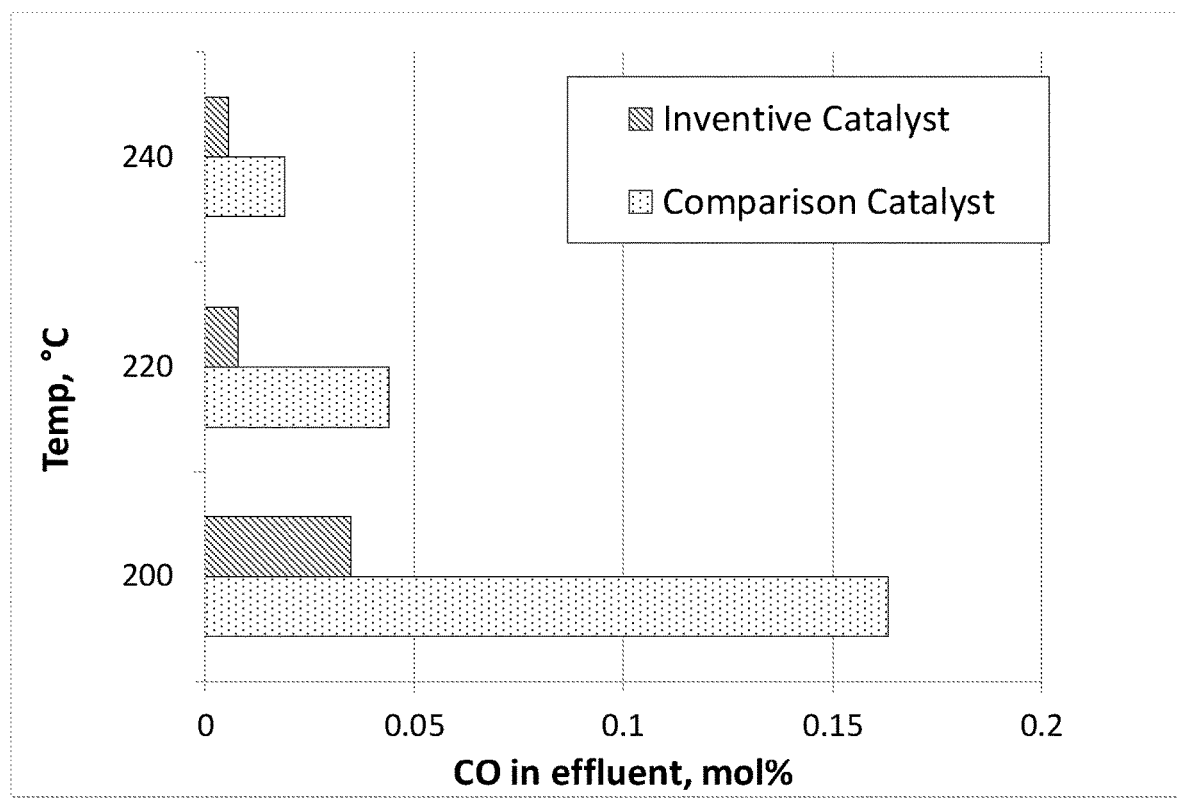
FIG. 3 is a bar chart comparing the performance of the inventive catalyst to that of a comparison catalyst when used in the conversion of carbon monoxide (CO) contained in a synthetic tail gas feed by showing the unconverted CO of the effluent of the reactor operated at various reactor temperatures.

FIG. 3 shows the data presented in Table 5 in the form of a bar chart illustrating the enhanced performance characteristics of the Inventive Catalyst A when compared to Comparison Catalyst B. These experimental results show that the inventive catalyst can be operated more than 20° C. lower in temperature than the comparison catalyst while maintaining roughly the same CO in the effluent. This is an extremely large improvement of approximately 72% in catalyst activity. The inventive catalyst provides for significantly reduced CO in the reactor effluent when compared to the reduction provided by the comparison catalyst at the same reactor temperatures.

Figure 4:
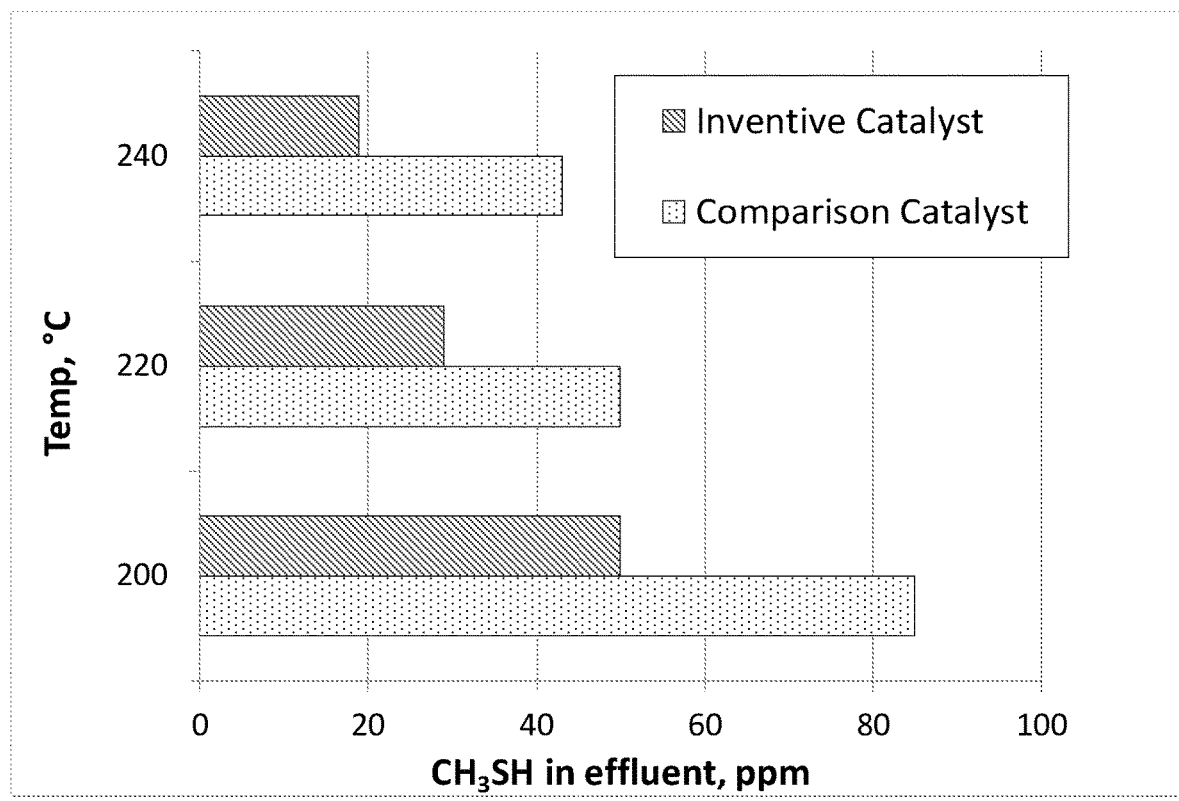
FIG. 4 is a bar chart comparing the performance of the inventive catalyst to that of a comparison catalyst when used in the conversion of methyl mercaptan ($CH_3SH$) contained in a synthetic tail gas feed by showing the unconverted $CH_3SH$ of the effluent of the reactor operated at various reactor temperatures.

FIG. 4 illustrates the enhanced performance characteristics of the Inventive Catalyst A when compared to Comparison Catalyst B. These experimental results show the inventive catalyst can be operated approximately 20° C. lower in temperature than the comparison catalyst while maintaining roughly the same $CH_3SH$ in the effluent. This is an extremely large improvement of approximately 72% in catalyst activity.

It will be apparent to one of ordinary skill in the art that many changes and modifications may be made to the described invention without departing from its spirit and scope as set forth in this specification.

What is claimed is:

1. A catalyst composition useful in the catalytic reduction of sulfur compounds contained in a gas stream, wherein said catalyst composition comprises: a calcined co-mulled mixture of an inorganic oxide, a first molybdenum compound, and a first cobalt compound, an overlayer of a second molybdenum compound and a second cobalt compound disposed on the calcined co-mulled mixture such that the catalyst composition has underbedded molybdenum, underbedded cobalt, overlaid molybdenum, and overlaid cobalt.

2. The catalyst as recited in claim 1, wherein said catalyst composition has a total molybdenum content of at least 7.4 wt. % and a total cobalt content of at least 2.7 wt. %, with both wt. % based on a total weight of said catalyst composition and the respective metal component as an oxide.

3. The catalyst as recited in claim 2, wherein said catalyst composition has a molybdenum ratio of underbedded molybdenum content-to-total molybdenum content in a range of from 1:5 to 4:5, and a cobalt ratio of underbedded cobalt content-to-total cobalt content in a range of from 1:5 to 4:5.

4. The catalyst as recited in claim 3, wherein said catalyst composition has a total metals ratio of total molybdenum content-to-total cobalt content in a range of from 1.5:1 to 6:1.

5. The catalyst as recited in claim 4, wherein said catalyst composition has a total inorganic oxide content in a range of from 65 to 90 wt. % based on the total weight of said catalyst composition.

6. The catalyst as recited in claim 5, wherein said underbedded molybdenum content is in a range of from 1.1 to 12.5 wt. % and said underbedded cobalt content is in a range of from 0.5 to 5 wt. % based on the total weight of the said catalyst composition and the respective metal component as an oxide.

7. A process, comprising:
introducing a gas stream, comprising a sulfur compound or carbon monoxide, or both, into a reactor that defines a reaction zone containing the catalyst composition of claim 1; and
contacting said gas stream with said catalyst composition under hydrolysis reaction conditions.

8. The process as recited in claim 7, wherein said sulfur compound is present in said gas stream at a sulfur compound concentration in the range of from 0.01 volume % to 2 volume %, and wherein said sulfur compound is selected from the group of compounds consisting of carbonyl sulfide (COS), carbon disulfide ($CS_2$), sulfur dioxide ($SO_2$), and elemental sulfur (Sx).

9. The process as recited in claim 8, wherein said hydrolysis reaction conditions include an inlet temperature to said reactor that is in a range of from 115° C. to 300° C.

10. The process as recited in claim 8, wherein said reduced concentration of sulfur compound in said treated gas is less than 75 ppmv.

* * * * *

UNITED STATES PATENT AND TRADEMARK OFFICE
CERTIFICATE OF CORRECTION

PATENT NO. : 12,121,883 B2
APPLICATION NO. : 18/448556
DATED : October 22, 2024
INVENTOR(S) : Karl Marvin Krueger Page 1 of 1

It is certified that error appears in the above-identified patent and that said Letters Patent is hereby corrected as shown below:

In the Claims

In Column 14, Line 55, in Claim 8, delete "the range" and insert -- a range --.

Signed and Sealed this
Twenty-first Day of January, 2025

Coke Morgan Stewart
*Acting Director of the United States Patent and Trademark Office*